(12) United States Patent
Lupton et al.

(10) Patent No.: US 7,378,022 B2
(45) Date of Patent: May 27, 2008

(54) SYSTEM AND METHODS FOR BIOLOGICAL SELENIUM REMOVAL FROM WATER

(75) Inventors: Francis S. Lupton, Evanston, IL (US); William G. Sheridan, Naperville, IL (US)

(73) Assignee: Honeywell International Inc., Morristown, NJ (US)

( * ) Notice: Subject to any disclaimer, the term of this patent is extended or adjusted under 35 U.S.C. 154(b) by 74 days.

(21) Appl. No.: 11/448,381

(22) Filed: Jun. 6, 2006

(65) Prior Publication Data

US 2007/0278150 A1 Dec. 6, 2007

(51) Int. Cl.
*C02F 3/28* (2006.01)
(52) U.S. Cl. .................. 210/603; 210/605; 210/615; 210/617; 210/631; 210/718; 210/722; 210/151; 210/188; 210/202; 435/262.5
(58) Field of Classification Search ............... 210/603, 210/615, 616, 617, 618, 605, 631, 718, 719, 210/722, 150, 151, 202, 209, 259, 188; 95/263; 96/202; 435/262, 262.5
See application file for complete search history.

(56) References Cited

U.S. PATENT DOCUMENTS

| | | | | |
|---|---|---|---|---|
| 4,519,913 A | * | 5/1985 | Baldwin et al. | 210/616 |
| 4,522,723 A | * | 6/1985 | Kauffman et al. | 210/616 |
| 4,664,804 A | * | 5/1987 | Morper et al. | 210/631 |
| 4,725,357 A | * | 2/1988 | Downing et al. | 210/617 |
| 4,789,478 A | * | 12/1988 | Revis et al. | 210/631 |
| 4,910,010 A | * | 3/1990 | Khalafalla | 210/616 |
| 5,009,786 A | * | 4/1991 | Oremland | 210/610 |
| 5,045,214 A | * | 9/1991 | Walker | 210/722 |
| 5,217,616 A | | 6/1993 | Sanyal et al. | |
| 5,362,394 A | * | 11/1994 | Blowes et al. | 210/617 |
| 5,587,079 A | * | 12/1996 | Rowley et al. | 210/719 |
| 5,637,210 A | * | 6/1997 | Vail et al. | 210/150 |
| 5,730,884 A | * | 3/1998 | Kikuchi | 210/748 |
| 6,033,572 A | * | 3/2000 | Yano et al. | 210/631 |
| 6,183,644 B1 | * | 2/2001 | Adams et al. | 210/611 |
| 6,325,923 B1 | * | 12/2001 | Zaluski et al. | 210/150 |

FOREIGN PATENT DOCUMENTS

| | | |
|---|---|---|
| EP | 0891951 A1 | 1/1999 |
| JP | 2006205097 A | 8/2006 |

OTHER PUBLICATIONS

Machine translation of Japanese publication 2006-205097, Aug. 2006.*

\* cited by examiner

*Primary Examiner*—Christopher Upton
(74) *Attorney, Agent, or Firm*—Ingrassia Fisher & Lorenz, P.C.

(57) ABSTRACT

A biological system for removing selenium from waste water comprises a first immobilized cell bioreactor (ICB) and a selenide removal module. The first ICB comprises a chamber having a substrate housed therein and situated to contact the waste water flowing therethrough during use. Anaerobic microorganisms are supported on the substrate, and comprise selenium respiring bacteria capable of reducing selenates and selenites to insoluble elemental selenium and/or sulfate reducing bacteria capable of reducing selenates and selenites to insoluble elemental selenium or to soluble selenides. The selenide removal module includes metallic or oxidized iron compounds capable of chemically reacting with selenide or sulfide compounds in the waste water to form iron selenide or iron sulfide precipitates.

23 Claims, 3 Drawing Sheets

SYSTEM AND METHODS FOR BIOLOGICAL SELENIUM REMOVAL FROM WATER

FIELD OF THE INVENTION

The present invention generally relates to systems and methods for removal of pollutants from water. More particularly, the present invention relates to systems and methods for removal of inorganic pollutants such as selenium from water.

BACKGROUND OF THE INVENTION

Environment-conscious industries are continuously laboring toward the goal of removing pollutants from contaminated water to make the water safe at both the ground level and the consumer level. Government-regulated agencies establish limits for many common industrial pollutants. These limits tend to become stricter as pollution reduction and removal technology proves effective at accomplishing previously-established requirements. Consequently, both ground and consumer level water continue to improve in terms of both purity and safety.

Among the methods employed to reduce or remove pollutants, bioremediation constitutes an effective and desirable technology. In a broad sense, bioremediation includes the use of microorganisms that digest pollutants as a source of food, including nitrogen and carbon compounds. Bacterial metabolism converts the pollutants to metabolites having a simple chemical structure, sometimes degrading the pollutants completely to carbon dioxide and water in an aerobic process, or to methane in an anaerobic process. In any respect, the metabolites produced by the bacteria typically have no adverse environmental effects.

Selenium is sometimes a major contaminant in waste water, including mine drainage and agricultural irrigation water. The present selenium maximum level for drinking water mandated by the Environmental Protection Agency is 0.05 parts per million (ppm). Several chemical processes have been developed for selenium removal from waste water, but they tend to be relatively expensive and require an undesirably large amount of time and machinery. Mining companies and government agencies such as the Bureau of Reclamation are incurring large costs to remediate selenium from mine drainage and irrigation water.

Accordingly, it is desirable to provide a method and system for removing selenium from waste water in a cost and time efficient manner. It is also desirable to provide such methods and systems that can replace some conventional chemical processes for selenium removal with biological processes and thereby reduce the requisite time, machinery, and operational costs for performing the processes. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A biological system is provided for removing selenium from waste water. The system comprises a first immobilized cell bioreactor (ICB) and a selenide removal module. The first ICB comprises a chamber, including a first inlet for receiving the waste water and a first outlet for releasing the waste water. A substrate is housed inside the chamber and situated to contact the waste water flowing therethrough during use. Anaerobic microorganisms are supported on the substrate, and comprise at least one class of bacteria selected from the group consisting of selenium respiring bacteria capable of reducing selenates and selenites to insoluble elemental selenium, and sulfate reducing bacteria capable of reducing selenates and selenites to insoluble elemental selenium or to soluble selenides. The selenide removal module includes a second inlet for receiving the waste water from the first ICB, a second outlet for releasing the waste water, and metallic or oxidized iron compounds capable of chemically reacting with selenide or sulfide compounds in the waste water to form iron selenide or iron sulfide precipitates.

A biological method is also provided for removing selenium from waste water. The waste water is passed through a chamber in a first immobilized cell bioreactor (ICB) comprising anaerobic microorganisms supported on a substrate, the anaerobic microorganisms comprising at least one class of bacteria selected from the group consisting of selenium respiring bacteria capable of reducing selenates and selenites to insoluble elemental selenium, and sulfate reducing bacteria capable of reducing selenates and selenites to insoluble elemental selenium or to soluble selenides. The waste water is then passed through a selenide removal module including metallic or oxidized iron compounds capable of chemically reacting with selenide or sulfide compounds in the waste water to form iron selenide or iron sulfide precipitates.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
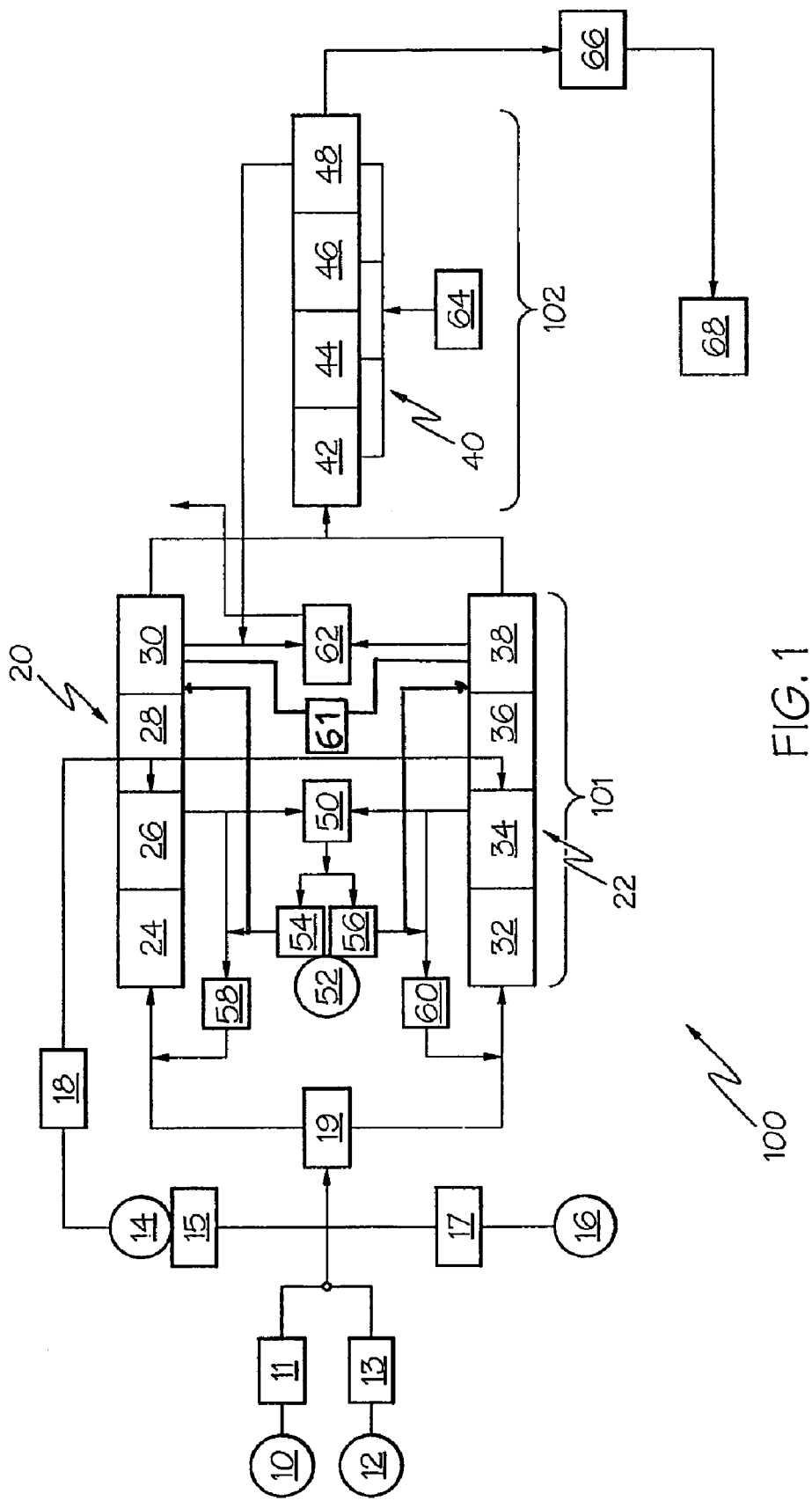
FIG. 1 is a flow diagram illustrating a system for removal of pollutants from waste water in accordance with an embodiment of the invention.

FIG. 1 is a flow diagram illustrating a system 100, and its various components, for removal of selenium from waste water according to an exemplary embodiment of the invention. The system 100 includes an anaerobic immobilized cell bioreactor (ICB) 101 and an aerobic ICB 102 in series. A pair of lagoons 10 and 12 supply waste water to the system 100 using a pair of respective pumps 11 and 13. Although two lagoons are included in the illustrated embodiment, the waste water may be supplied from a single lagoon, and a single pump may be used to supply the waste water to the system 100. Likewise, more than two lagoons and/or pumps may be used to supply the waste water. The waste water includes pollutants such as selenium and/or selenium compounds that are to be removed using the system 100.

Before water is introduced into the system 100, a first supply of nutrients 14 and a second supply of nutrients 16 are pumped into the water using a pair of respective pumps 15 and 17. The first supply of nutrients 14 is a source of carbon-based nutrients, including simple sugars such as fructose or lactose, more complex sugar sources such as molasses, and alcohols such as ethanol. The sugars and alcohols are food to sustain bacteria that remove waste water pollutants as part of the system's anaerobic phase 101. The first nutrient supply 14 may also include lesser or even trace amounts of micronutrient components such as vitamins, organic extracts, and/or minerals. A second pump 18 may optionally be included to pump the first nutrient supply 14 to enrich and sustain bacteria in downstream bioreactor chambers that are in the anaerobic stage 101. The second supply of nutrients 16 is a source of nitrogen and phosphorus to sustain the bacteria in the system's anaerobic phase 101. Exemplary nitrogen and phosphorus constituents include urea, phosphoric acid, diammonium phosphate, and potassium phosphate. As with the first nutrient supply 14, the second nutrient supply 16 may also include lesser or even trace amounts of micronutrient components such as vitamins, organic extracts, and/or minerals.

Waste water is first pumped from the lagoons 11 and 12, and is channeled by way of a weir box 19 into the anaerobic ICB 101. In the illustrated system 100, the anaerobic ICB 101 is actually a pair of ICB modules 20 and 22 that operate in parallel, although a single ICB or more than two modules may be used. The weir box 19 is just one of many exemplary apparatus configurable to split hydraulic flow and thereby channel the waste water to one or both of the parallel anaerobic modules 20 and 22.

The first illustrated module 20 includes three substantially identical upstream chambers 24, 26, and 28 and the second illustrated module 22 also includes three substantially identical upstream chambers 32, 34, and 36. Each chamber includes packing material having bacteria supported thereon. More particularly, at least selenium respiring bacteria are sustained on the packing material, and are continuously nourished by the nutrient supplies 14 and 16 included in the waste water. In a preferred embodiment, sulfate reducing bacteria are also sustained on the packing material. In order to avoid potential depletion of nutrients by the bacteria in the most upstream chambers 24, 26, 32, and 34, a flow of at least the base nutrients 14 are pumped to at least some of the downstream chambers. For example, in FIG. 1 the base nutrients 14 are being pumped directly to downstream chambers 28 and 36, bypassing upstream chambers in which bacteria are already receiving nutrient-rich waste water. Although the nutrients are depicted as being pumped into only the upstream chambers 28 and 36, the nutrients may also be supplied to the downstream chambers 26 and 34 instead of or in addition to the upstream chambers 28 and 36.

Figure 2:
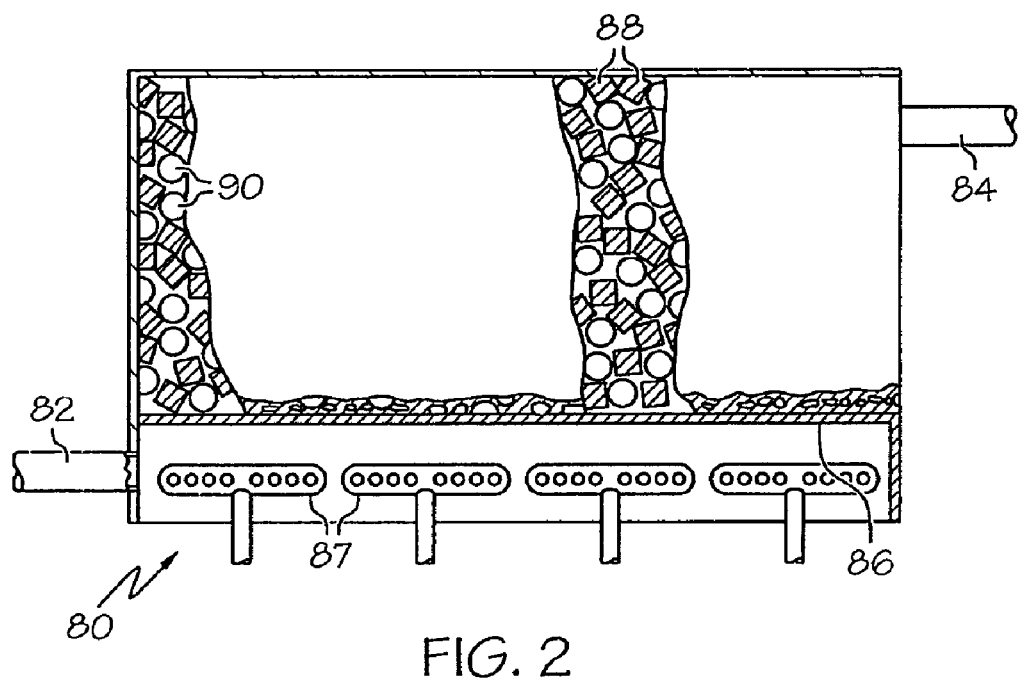
FIG. 2 is a cutaway view of an immobilized cell bioreactor for removing pollutants from waste water in accordance with an embodiment of the invention.

Each of the upstream chambers in the anaerobic ICB 101 is essentially a reactor through which the wastewater flows at a rate that is sufficient to reduce the concentration of particular pollutants such as selenium, sulfur, and compounds thereof by contacting the water with microorganisms. The basic reactor structure for each chamber is depicted as a cutaway view in FIG. 2. However, the design and configuration of the reactor and the materials contained therein may vary widely. An exemplary reactor, and methods of removing pollutants from waste water using the same, is disclosed in U.S. Pat. No. 5,217,616 and is hereby incorporated herein in its entirety by reference. The reactor 80 includes an inlet 82 through which the waste water enters to pass through the reactor 80, and an outlet 84 through which the waste water exits. From the outlet 84, the waste water either enters another reactor by way of an inlet, or exits the anaerobic ICB 101.

Inside the reactor 80 is a fixed bed or a substantially fixed bed of biologically active components 88 including at least selenium respiring bacteria, and preferably also includes sulfate reducing bacteria. The term "fixed bed" signifies that the biologically active components 88 and the bacteria supported thereon are substantially stationary as the waste water flows through the reactor 80. The biologically active components 88 are primarily a porous substrate that will be subsequently described. The substrate is supported by a porous screen or plate 86, which also supports a plurality of low density bodies 90, which are hollow scaffolding structures, an exemplary embodiment of which will be subsequently described. The low density bodies 90 provide open space for the waste water to flow through the reactor at a sufficiently fast rate to enable fluid contact with the biologically active components 88 for substantial removal of the predetermined waste water pollutants.

Figure 3:
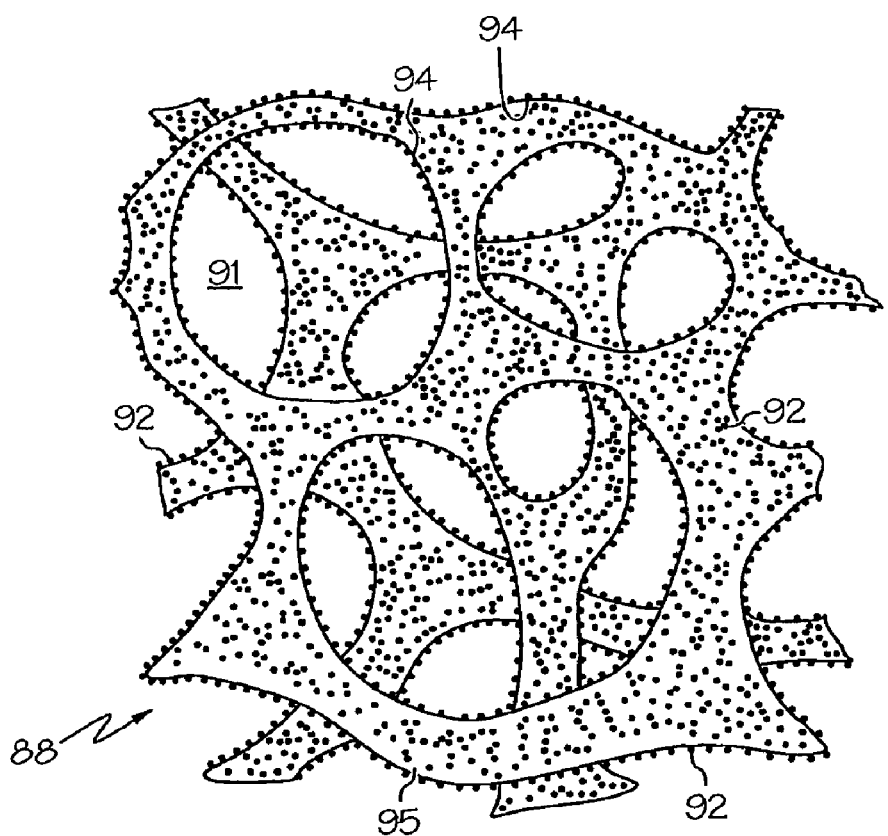
FIG. 3 is a cross-sectional view of a biologically active component that is used to remove pollutants from waste water in accordance with an embodiment of the present invention.

FIG. 3 is a cross-sectional view of an exemplary biologically active component 88, which is a porous substrate 95 that defines a web of walls having passages or voids 91 therebetween. The web-like structure provides a high surface area to volume ratio, and consequently supports a high concentration of microorganisms 92, typically colonized as a microbial biofilm, and including bacteria capable of metabolizing pollutants contained in the waste water stream. As previously mentioned, the bacteria in the anaerobic ICB 101 include either anaerobic selenium respiring bacteria, sulfate reducing bacteria, or both. The selenium respiring bacteria enzymatically reduce selenate and selenite to elemental selenium. The sulfate reducing bacteria anaerobically respire sulfate compounds and produce as a respiration product hydrogen sulfide ($H_2S$). $H_2S$ readily reacts with any selenate or selenite compounds in the waste water, and produces as a reaction product elemental selenium. Selenium is insoluble in water, and consequently precipitates out of the waste water either on the bottom of one of the anaerobic chambers 24, 26, 28, 32, 34, and 36 or is absorbed by the microbial biofilm and/or the substrate 95. Any elemental selenium, originally in the waste water or enzymatically produced or as a reaction product with $H_2S$, is substantially retained in the anaerobic ICB 101. Other reduced selenium compounds, such as hydrogen selenide, methyl selenide, and dimethyl selenide, are also sometimes formed as reaction products in the anaerobic ICB 101. As will be subsequently described, another feature of the present invention is the removal of these reduced selenides from the waste water downstream of the anaerobic chambers 24, 26, 28, 32, 34, and 36.

In an exemplary embodiment, at least part of the component substrate 95 includes an absorbent 94 or is otherwise provided with a capacity for absorbing one or more pollutant from the waste water stream to enhance pollutant biodegradation using the microorganisms 92. In another exemplary embodiment, the substrate itself is sufficiently absorbent for particular pollutants that a coating of absorbent is not necessary. Other optional materials may be included on or in the component surface 95, including cations and/or materials having positively charged groups, and density-increasing substances, density-reducing substances, coloring agents, and short fibers of an organic or inorganic base such as glass fibers and gel-forming macromolecular substances such as cellulose, alginate, starch, and carrageenan.

Each of the biologically active components 88 is a particulate having a size and shape that may vary widely from particulate to particulate. For example, the components 88 may have a regular shape such as a cube, rod, rectangle, sphere, spiral, or hexagon, or they may have an irregular shape. The particulate size may be anywhere between about 0.10 inch to about 12 inches. The components 88 have internal and external surface area to volume ratio is significantly greater than the low density bodies 90. The greater the difference in such a ratio between the components 88 and the low density bodies 90, the more effective the pollution removal process, and the ratio can be up to at least about 20 times greater for the components 88 than for the low density bodies 90. Components 88 may be used alone without low density bodies 90. The amount of substrate 95 included in the components 88 may vary widely, although in general the amount of substrate 95 for each particulate is from about 50 to about 95 weight percent based on the total particulate weight, with the remaining weight percentage being primarily attributed to microorganisms 92 and any absorbent that may be included. The voids 91 are from about 40 to about 98 volume %. The substrate 95 is formed from any material capable of forming a porous particulate and supporting microorganisms 92. Inorganic materials and organic plastics are exemplary materials, including those disclosed in U.S. Pat. No. 5,217,616, which also discloses exemplary materials for other reactor components.

Figure 4:
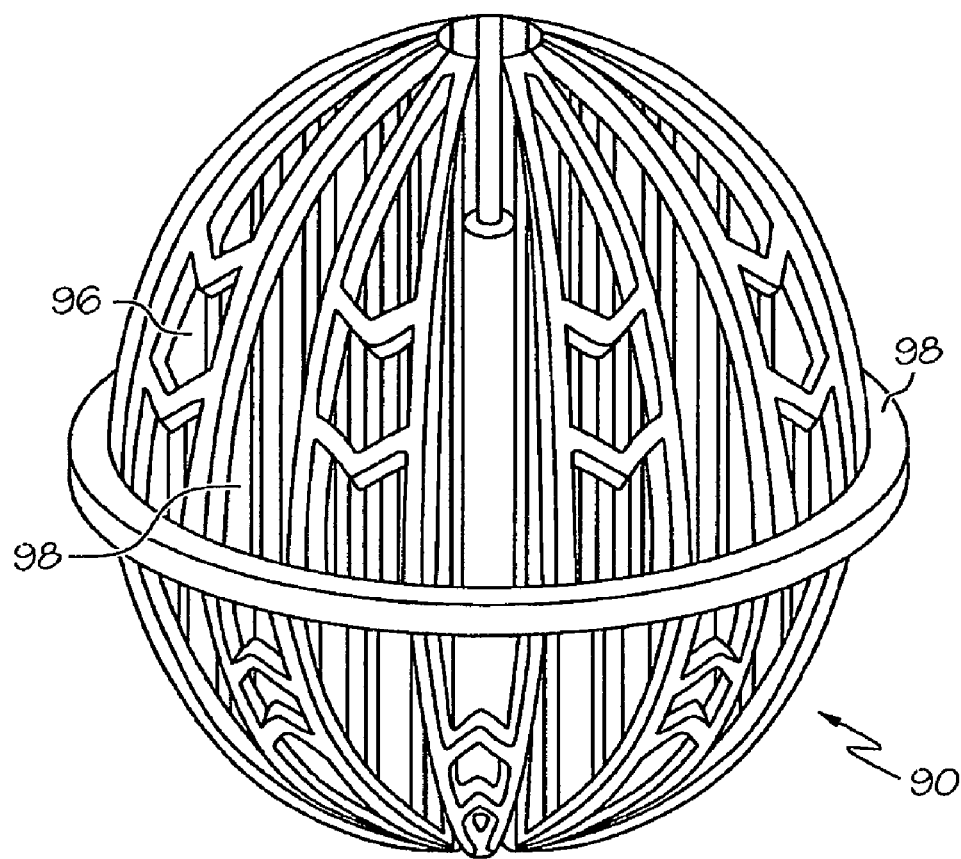
FIG. 4 a perspective view of a low density body through which waste water flows to enable substantial fluid contact with biologically active components in a bioreactor in accordance with an embodiment of the present invention.

FIG. 4 is a perspective view of a low density body 90 through which waste water flows to enable substantial fluid contact with the biologically active components 88. Although the low density body 90 is depicted as a substantially spherical object, shape is not critical, and the body may take the form of substantially any other shapes such as a square or cube, for example. Regardless of the overall shape, the body 90 defines internal spaces 96 from a plurality of spaced ribs 98. The ribs 98 may have any other desirable construction such as a vane or fin shape. To enable fluid contact with the external and internal surfaces of the biologically active components 88, exemplary low density bodies 90 have internal spaces 96 that occupy at least about 40% of the low density body volume, and more preferably occupy approaching 95% or more of the overall low density body volume, with structural features such as the ribs 98 occupying the remaining volume.

The biologically active components 88 and low density bodies 90 are positioned and proportioned in the anaerobic ICB 101 in a manner whereby at least 50% of the internal and external surfaces of at least 50% of the biologically active components 88 are adjacent to the low density bodies 90. More preferably, at least 60 to 80% of the internal and external surfaces of at least 60 to 80% of the biologically active components are so situated, and are consequently in contact with the waste water fluid stream flowing through the anaerobic ICB 101 during use. The biologically active components 88 and low density bodies 90 are preferably supported in the anaerobic ICB 101 with a substantially homogenous distribution.

Returning now to FIG. 1, a pH controller 50 is included in the system 100 for maintaining a pH level at about 7.0, although microorganisms may be sustained at pH levels between about 6.0 and about 8.5 using the controller 50. pH control in the anaerobic ICB 101 is particularly important during system start-up, during which the microorganisms proliferate, stabilize on the substrate 95, and reach an optimal functioning state. System start-up may take up to four to six weeks. After start-up, pH control is not typically necessary unless a significant process change occurs, such as substantial change in waste water composition or volume, or a system upset occurs, or in the event of a system shutdown and restart. The base nutrients 14, including molasses and sugars, tend to acidify the waste water. For this reason, the controller 50 regulates addition of an acid or base 52 to the waste water. The controller 50 includes a pH meter that is in fluid communication with ICB chambers 26 and 34. The pH meter receives a flow of waste water and measures the pH level. If the waste water is acidic, then the controller 50 activates pumps 58 and 60, which create a stream of recirculating waste water flowing from chambers 26 and 34 into chambers 24 and 32, respectively. The controller 50 also activates pumps 54 and 56, which pump needed amounts of base 52 into the recirculating waste water stream to bring the pH level to about 7.0. Numerous bases may be supplied to the recirculating waste water stream, an exemplary base 52 being sodium hydroxide.

Anaerobic ICB 101 also comprises downstream-most chambers 30 and 38 of modules 20 and 22, respectively. Each of the downstream-most chambers 30 and 38 is a selenide removal module. Exemplary selenide removal modules include a metallic or oxidized iron additive such as a ferrous iron additive, a ferric iron additive, or an iron sponge. The iron additive chemically reacts with selenides or sulfides, such as hydrogen selenide, organic selenides, and hydrogen sulfide, and removes them from the water stream by forming stable iron selenides and iron sulfide, respectively. The iron selenides and iron sulfide compounds are not water soluble, and therefore precipitate and settle out of the water by clarification and/or filtration. An iron sponge includes hydrated iron oxide on a carrier of wood shavings and chips, and is normally used in a gas purification process to remove corrosive odorants such as hydrogen sulfide from a gas stream. This process is conventionally effective for high-pressure natural gas applications, low-pressure systems, sewage gas from anaerobic digestion of sewer sludge, and for biogas produced by landfills and agricultural anaerobic digesters. According to the present invention, the iron additive such as the iron sponge is included in the waste water stream to at least adsorb any hydrogen selenide formed as a reaction product in the anaerobic ICB 101. The iron additive also simultaneously removes any sulfides in the waste water stream. Since hydrogen selenide is water soluble and highly toxic, the iron additive in the chambers 30 and 38 is an important system element for its ability to precipitate and remove the selenide from the water stream. Further, the iron additive is an efficient and simple selenide removal module.

Another exemplary selenide removal module includes a gas scrubber. A gas scrubber introduces air or an inert gas such as nitrogen with a low oxygen concentration into the waste water stream using a gas supply 61 that may include a blower. The gas captures volatile compounds such as selenides and sulfides, and carries them out of the chambers 30 and 38 through an offgas stream. Selenide and/or sulfide scrubbing in such a device can be enhanced, controlled, and optimized via adjustment of aqueous pH to a specific range for the given waste water, such as between 2 and 6, for example. To incorporate pH control, the acid or base 52 is pumped into the chambers 30 and 38. The air scrubber or inert gas scrubber may also be operated without pH adjustment. In an exemplary embodiment, the system 100 includes an iron sponge module 62 for offgassing from the air scrubber or inert gas scrubber. The iron sponge module 62 is separate and distinct from any iron additive in chambers 30 and 38 in terms of both its location and its operation. As previously discussed, the iron sponge module 62 removes any selenide and sulfide compounds such as hydrogen selenide, organic selenides, and hydrogen sulfide, from the offgas stream by forming iron selenides and iron sulfide, which precipitate from the gas and adsorb as a solid onto the iron sponge in the module 62. From the iron sponge module 62, gas is removed from the system 100.

Still another exemplary selenide removal module includes a mechanical agitator. Selenides and sulfides can be removed from the aqueous phase to offgas phase by means of mechanical agitation, for example, by means of a mechanical mixer or recirculation pumps with or without installed tank baffles or by other mechanical agitation means. The offgas from a mechanical mixing device may be directed to a gas scrubber such as the previously-described iron sponge module 62 for removal of the gas from the system 100.

From the anaerobic ICB 101, the waste water flows through the aerobic ICB 102 for removal of pollutants using aerobic microorganisms including conventional aerobic bacteria and aerobic sulfur-oxidizing bacteria. These microorganisms polish trace levels of nutrients, sulfides, biological and chemical oxygen demand chemicals, and total organic carbon. The aerobic ICB 102 also raises the oxidation/reduction potential to meet waste water discharge criteria as set by regulatory agencies for discharge to the environment or to domestic sewerage systems.

The aerobic ICB 102 comprises a module 40 that includes a series of chambers 42, 44, 46, and 48. Waste water from the anaerobic ICB 101 enters the first chamber 42 and cascades through chambers 44 and 46, and then exits the aerobic ICB 102 from the downstream-most chamber 48. Offgas is also emitted from the downstream-most chamber 48, odors and pollutants such as sulfide compounds are scrubbed using the iron sponge module 62 before the gas is released to the atmosphere.

Each of the chambers 42, 44, 46, and 48 in the aerobic ICB 102 is a reactor through which the wastewater flows. The chambers 42, 44, 46, and 48 have the same structure as those previously described and depicted with reference to the anaerobic ICB 101, although the microorganisms in the chambers 42, 44, 46, and 48 are aerobic and not anaerobic, and therefore remove different pollutants than those removed in the anaerobic ICB 101. The microorganisms in the aerobic ICB 102 require oxygen to survive. Returning to FIG. 2, each reactor 80 of chambers 42, 44, 46, and 48 includes and utilizes diffusers 87 to introduce oxygen or other oxygen-containing gas, such as air, into the reactor 80 for the aerobic microorganisms therein. The diffusers 87 are attached to an oxygen-containing gas supply 64 that may include a blower or pump, for streaming or bubbling the gas into the reactor 80. The gas passes across the packed bed of microorganisms. The reactors in the anaerobic ICB 101 may either exclude the diffusers 87 or simply not use them since oxygen is not needed to sustain anaerobic microorganisms.

Upon exiting the aerobic ICB 102, the waste water is released as treated water 68 to either sewer, or to the environment if the waste water is sufficiently clean, or can possibly be reused if it meets quality requirements. Prior to being released, additional treatment may be performed using additional treatment components, such as a downstream filter 66. An exemplary downstream filter 66 is a sand filter for removing particulates and clarifying the water before releasing it as treated water 68.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A biological system for removing selenium from waste water, the system comprising the steps of:
    a first immobilized cell bioreactor (ICB), comprising:
        a chamber, including a first inlet for receiving the waste water and a first outlet for releasing the waste water,
        a substrate housed inside the chamber and situated to contact the waste water flowing therethrough during use,
        anaerobic microorganisms supported on the substrate, the anaerobic microorganisms comprising sulfate reducing bacteria capable of reducing selenates and selenites to soluble selenides; and
    a selenide removal module, including a second inlet for receiving the waste water from the first ICB, a second outlet for releasing the waste water, and metallic or oxidized iron compounds capable of chemically reacting with selenide or sulfide compounds in the waste water to form iron selenide or iron sulfide precipitates.

2. The system according to claim 1, wherein the selenide removal module further comprises a gas scrubber, comprising:
    a gas inlet for introducing a gas into the selenide removal module and flowing the gas through the waste water to capture at least volatile selenides therefrom in an outgassing stream; and
    a gas outlet for releasing the outgassing stream from the selenide removal module.

3. The system according to claim 2, further comprising a pH control system, comprising:
    an acid or base supply in fluid communication with the selenide removal module; and
    a controller coupled and configured to regulate introduction of the acid or base into the selenide removal module and thereby bring the waste water to a pH level at which capture of at least volatile selenides in the outgassing stream is optimized.

4. The system according to claim 2, further comprising a gas source in fluid communication with the gas inlet, and containing a gas adapted to capture at least volatile selenides from the waste water.

5. The system according to claim 4, wherein the gas is further adapted to capture volatile sulfides from the waste water.

6. The system according to claim 5, wherein the gas is selected from the group consisting of air, nitrogen, and an inert gas.

7. The system according to claim 1, wherein the selenide removal module further comprises:
    a mechanical agitator for agitating the waste water stream and thereby releasing at least volatile selenides from the waste water and into an outgassing stream; and
    a gas outlet for releasing the outgassing stream from the selenide removal module.

8. The system according to claim 1, further comprising an off gas iron-containing scrubber for removing at least volatile selenides from offgas produced from the first ICB or the selenide removal module.

9. The system according to claim 1, wherein the metallic or oxidized iron compounds are selected from the group consisting of an iron sponge, a ferric iron additive, and a ferrous iron additive.

10. The system according to claim 1, further comprising:
a second immobilized cell bioreactor (ICB) in fluid communication with the first ICB, the second ICB comprising:
a chamber, including a first inlet for receiving the waste water and a first outlet for releasing the waste water,
a substrate housed inside the chamber and situated to contact the waste water flowing therethrough during use, and
aerobic microorganisms supported on the substrate, the microorganisms being capable of removing predetermined pollutants from the waste water.

11. The system according to claim 1, wherein the anaerobic microorganisms further comprise selenium respiring bacteria capable of reducing selenates and selenites to insoluble elemental selenium.

12. The system according to claim 1, wherein sulfate reducing bacteria is further capable of reducing selenates and selenites to insoluble elemental selenium.

13. A biological method for removing selenium from waste water, the method comprising the steps of:
passing the waste water through a chamber in a first immobilized cell bioreactor (ICB) comprising anaerobic microorganisms supported on a substrate, the anaerobic microorganisms comprising sulfate reducing bacteria capable of reducing selenates and selenites to soluble selenides; and
passing the waste water from the first ICB through a selenide removal module including metallic or oxidized iron compounds capable of chemically reacting with selenide or sulfide compounds in the waste water to form iron selenide or iron sulfide precipitates.

14. The method according to claim 13, further comprising:
introducing a gas into the selenide removal module and flowing the gas through the waste water to thereby capture at least volatile selenides therefrom in an outgassing stream.

15. The method according to claim 14, further comprising a pH control system, comprising:
introducing an acid or base into the selenide removal module and thereby bringing the waste water to a pH level at which capture of at least volatile selenides in the outgassing stream is optimized.

16. The method according to claim 14, wherein the step of introducing a gas into the selenide removal module further captures volatile sulfides from the waste water.

17. The method according to claim 16, wherein the gas is selected from the group consisting of air, nitrogen, and an inert gas.

18. The method according to claim 13, further comprising:
mechanically agitating the waste water stream in the selenide removal module and thereby releasing at least volatile selenides from the waste water and into an outgassing stream.

19. The method according to claim 13, further comprising:
passing an offgas produced from the first ICB or the selenide removal module through an iron-containing scrubber for removing at least volatile selenides from the offgas.

20. The method according to claim 13, wherein the metallic or oxidized iron compounds are selected from the group consisting of an iron sponge, a ferric iron additive, and a ferrous iron additive.

21. The method according to claim 13, further comprising:
passing the waste water through a chamber in a second immobilized cell bioreactor (ICB) in fluid communication with the first ICB and comprising aerobic microorganisms supported on a substrate, the microorganisms being capable of removing predetermined pollutants from the waste water.

22. The method according to claim 13, wherein the step of passing comprises the step of passing the waste water through the chamber in the first immobilized cell bioreactor (ICB) comprising the anaerobic microorganisms that further comprise selenium respiring bacteria capable of reducing selenates and selenites to insoluble elemental selenium.

23. The method according to claim 13, wherein the step of passing comprises the step of passing the waste water through the chamber in the first immobilized cell bioreactor (ICB) comprising the anaerobic microorganisms that comprise the sulfate reducing bacteria that is further capable of reducing selenates and selenites to insoluble elemental selenium.

* * * * *